(12) United States Patent
Swanberg (10) Patent No.: US 9,135,184 B2
(45) Date of Patent: Sep. 15, 2015

(54) LOAD-THROUGH FAULT MECHANISM

(71) Applicant: International Business Machines Corporation, Armonk, NY (US)

(72) Inventor: Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/104,026

(22) Filed: Dec. 12, 2013

(65) Prior Publication Data

US 2015/0169464 A1 Jun. 18, 2015

(51) Int. Cl.
*G06F 12/10* (2006.01)
*G06F 12/12* (2006.01)

(52) U.S. Cl.
CPC .......... *G06F 12/1009* (2013.01); *G06F 12/122* (2013.01)

(58) Field of Classification Search
CPC .............. G06F 12/0246; G06F 3/0679; G06F 2212/2022; G06F 2212/7211; G11C 16/102
USPC ........................................................ 711/103
See application file for complete search history.

(56) References Cited

U.S. PATENT DOCUMENTS

| | | | |
|---|---|---|---|
| 7,571,283 B2 | 8/2009 | Frommer et al. | |
| 8,219,746 B2 | 7/2012 | Tremaine | |
| 8,271,745 B2 | 9/2012 | Ware | |
| 8,327,076 B2 | 12/2012 | Murphy et al. | |
| 8,495,318 B2 | 7/2013 | Tremaine et al. | |
| 2011/0082967 A1 | 4/2011 | Deshkar et al. | |
| 2011/0131366 A1 | 6/2011 | Nakai et al. | |
| 2012/0216003 A1 | 8/2012 | Nakai et al. | |
| 2013/0166834 A1 | 6/2013 | Mayhew et al. | |

FOREIGN PATENT DOCUMENTS

JP 06036558 A 2/1994

OTHER PUBLICATIONS

In, Jihyun et al., "SWL: A Search-While-Load Demand Paging Scheme with NAND Flash Memory", LCTES'07, San Diego, California, Jun. 13-15, 2007, pp. 217-225.
Park, Dongshul et al., "CFTL: A Convertible Flash Translation Layer Adaptive to Data Access Patterns", Sigmetrics'10, New York, New York, Jun. 14-18, 2010, 2 pages.
U.S. Appl. No. 14/302,936.

*Primary Examiner* — Farley Abad
(74) *Attorney, Agent, or Firm* — Francis Lammes; Stephen J. Walder, Jr.; Thomas E. Tyson (57) ABSTRACT

A mechanism is provided for accessing data in a hybrid hardware managed cache in front of flash memory enabling load/store byte addressability to flash memory. A determination is made as to whether a real address associated with the effective address associated with a request resides in a page table. Responsive to the real address existing in the page table, responsive to the real address referring to a flash page, and, responsive to the flash page failing to reside in the hybrid hardware managed cache, a load-through fault is issued that allows the faulting processor executing the request to execute other work while the flash page is brought into the hybrid hardware managed cache. The operation is then issued to the new hybrid hardware managed cache real address.

16 Claims, 8 Drawing Sheets

LOAD-THROUGH FAULT MECHANISM

BACKGROUND

The present application relates generally to an improved data processing apparatus and method and more specifically to load-through fault mechanism.

Flash memory and other evolving forms of persistent memory introduce a new tier in the storage hierarchy. This tier is significantly lower latency of access than magnetic spinning disk, but still significantly longer latency than dynamic random-access memory (DRAM). For this reason, flash memory is not currently deployed with a "load-store" byte addressable model and, instead, is managed with disk-like block input/output (I/O). Flash memory being managed this way translates into requiring traditional disk-like access and programming methods which results in extensive central processing unit (CPU) pathlength and additional latency when managing flash.

SUMMARY

In one illustrative embodiment, a method, in a data processing system, is provided for accessing data in a hybrid hardware managed cache. The illustrative embodiment determines whether a real address associated with the effective address resides in a page table in response to receiving a request to perform an operation at an effective address. The illustrative embodiment determines whether the real address refers to a flash page or a normal page in response to the real address existing in the page table. The illustrative embodiment determines whether the flash page resides in a portion of system memory dedicated as the hybrid hardware managed cache in response to the real address referring to a flash page. Responsive to the flash page failing to reside in the hybrid hardware managed cache, the illustrative embodiment issues a load-through fault thereby allowing a faulting processor executing the request to execute other work while the flash page is brought into the hybrid hardware managed cache, assigns a new hybrid hardware managed cache real address in the hybrid hardware managed cache, and moves the flash page from a flash memory to the hybrid hardware managed cache. The illustrative embodiment then issues the operation to the new hybrid hardware managed cache real address.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In current data processing systems, there are already many levels of hardware managed caches, such as Level 1 (L1) cache, Level 2 (L2) cache, and Level 3 (L3) cache. Each of these caches is at a tier higher than dynamic random-access memory (DRAM), such that these caches cache DRAM contents. The management of these caches is completely transparent to the operating system and software executed by the operating system. This is possible, since the worst case latencies due to a miss in these caches is whatever the DRAM latency is, i.e. on the order of 100 nanoseconds. These types of latencies are within tolerance for a central processing unit's (CPU's) load or store instruction to be stalled in the CPU waiting for the access to complete.

Thus, the illustrative embodiments provide a new collaborative form of virtual memory management between the operating system and hardware memory management unit, resulting in a hybrid hardware managed cache with operating system virtual memory management. The illustrative embodiments create another level of hardware managed cache which is implemented in system memory, such as a DRAM, in front of flash memory. In this case, the hardware memory management unit is completely managing the DRAM cache, performing its own least recently used (LRU) algorithms, and managing the movement of data between the DRAM cache and the flash memory. By creating this hardware managed cache in the DRAM, the operating system is alleviated from performing any management of the new hardware managed cache in software running on the CPUs. However, a worst case latency due to a miss in the new hardware managed cache is now a function of the flash memory latency. This latency, which may be on the order of 10's to 100's of microseconds, may not be acceptable for a CPU load or store to be stalled waiting for the load or store to complete. Therefore, the illustrative embodiments also provide an additional enhancement to the virtual memory management.

Figure 1:
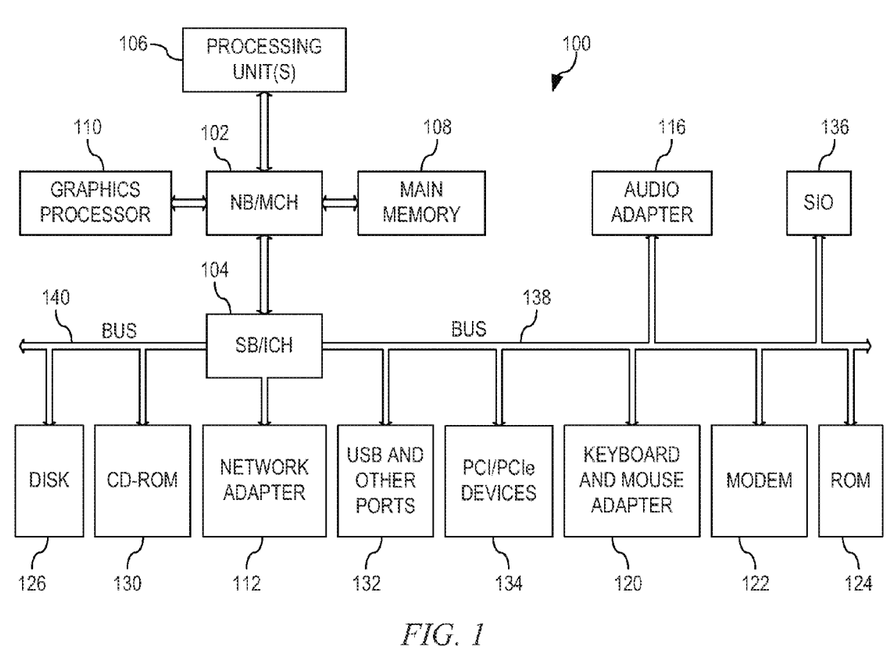
FIG. 1 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System P® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
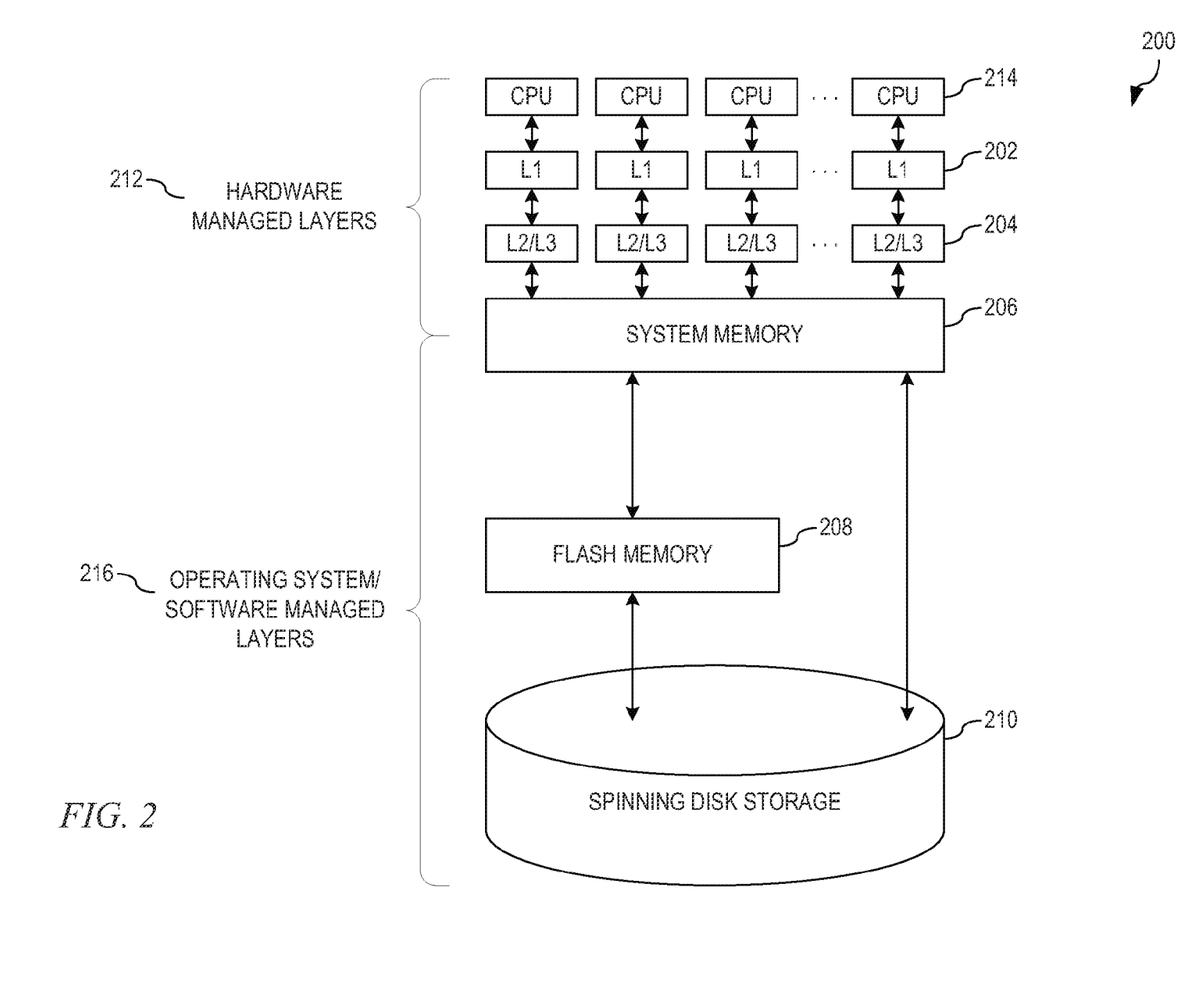
FIG. 2 depicts a current storage hierarchy in accordance with an illustrative embodiment.

FIG. 2 depicts a current storage hierarchy in accordance with an illustrative embodiment. Storage hierarchy 200 comprises Level 1 (L1) cache 202, Level 2 (L2)/Level 3 (L3) caches 204, system memory 206, flash memory 208, and spinning disk storage 210. Flash memory 208 may be a flash solid state drive (SSD), flash dual inline memory module (DIMM), or flash Peripheral Component Interconnect (PCI) card. As is illustrated, L1 cache 202, L2/L3 cache 204, and system memory 206 are hardware managed layers 212 managed by central processing units (CPUs) 214. In operation, CPUs 214 manage spills and fetches between L1 cache 202 and L2/L3 caches 204 and system memory 206. However, loads and stores from central processing units 214 stall on cache misses. Further, system memory 206, flash memory 208, and spinning disk storage 210 are operating system/software (OS/SW) managed layers 216. In operation, the OS/SW manages spills and fetches between system memory 206 and flash memory 208, and spinning disk storage 210. The OS/SW further leverages virtual memory management, such as page table management, page faults, page moves between memory and backing store, context switches to run other work on CPUs 214 while waiting for inputs/outputs (I/Os). For the OS/SW managed case, the media latency is too long for the CPUs 214 to be stalled on loads and stores in the case when the page is not in memory. Therefore the OS/SW performs a context switch to block the faulting thread so CPUs 214 may be used to run another thread until the needed page is brought into memory. Thus, in storage hierarchy 200, OS virtual memory management has the issues of additional pathlength and CPU consumption in performing the virtual memory management and movement of pages between system memory 206, flash memory 208, and spinning disk storage 210.

Figure 3:
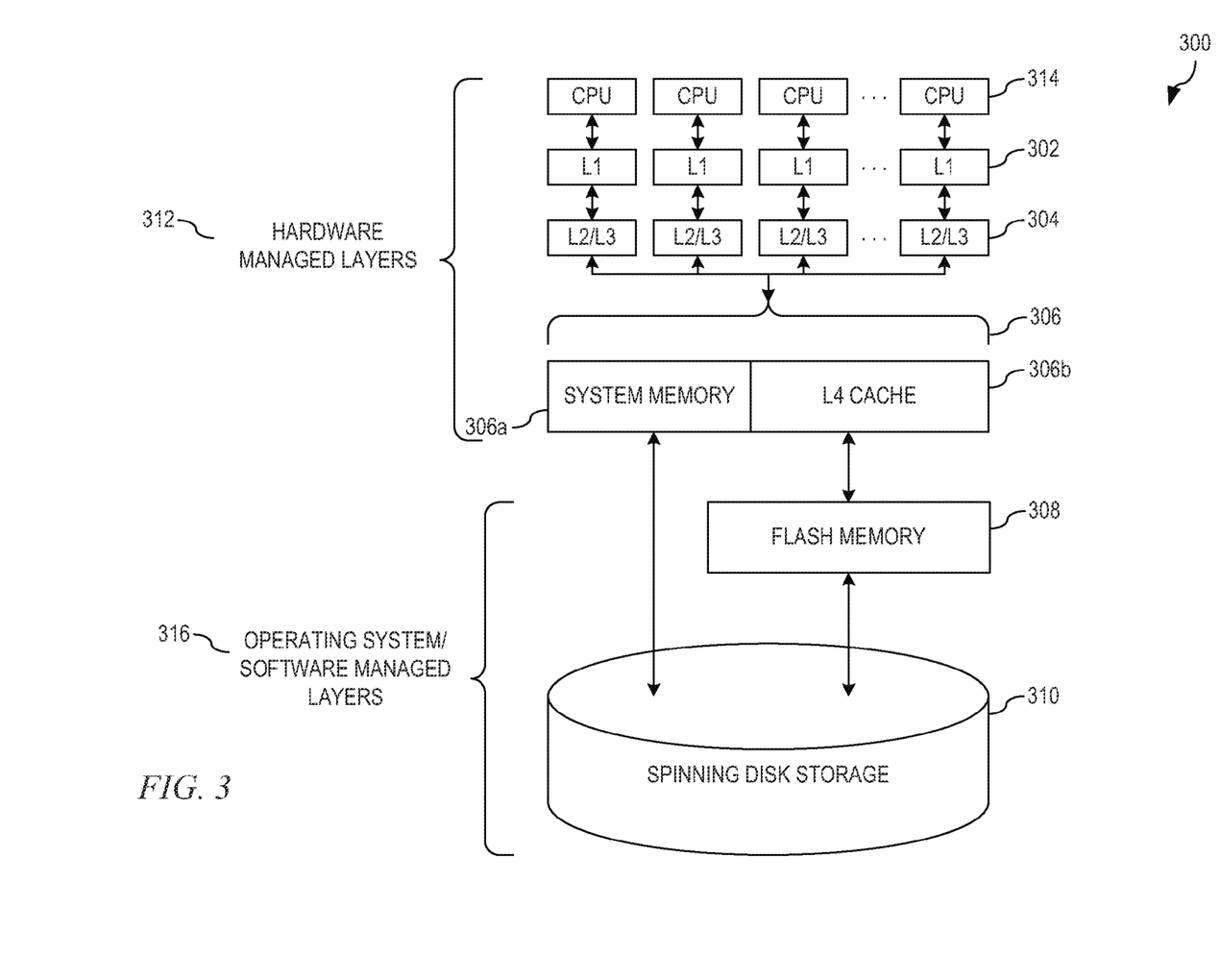
FIG. 3 depicts a storage hierarchy with a new collaborative form of virtual memory management between the operating system and hardware memory management unit in accordance with an illustrative embodiment.

FIG. 3 depicts a storage hierarchy with a new collaborative form of virtual memory management between the operating system and hardware memory management unit in accordance with an illustrative embodiment. Similar to FIG. 2, storage hierarchy 300 comprises Level 1 (L1) cache 302, Level 2 (L2) cache/Level 3 (L3) cache 304, system memory 306, flash memory 308, and spinning disk storage 310. Flash memory 308 may be a flash solid state drive (SSD), flash dual inline memory module (DIMM), or flash Peripheral Component Interconnect (PCI) card. However, in storage hierarchy 300, system memory 306, which may be a dynamic random access memory (DRAM), is separated into a portion that operates as system memory 306a as well as a portion that operates as another level of cache (L4 cache) 306b. Therefore, hardware managed layers 312 are extended to be managed by CPUs 314 and/or a memory management unit (MMU) (not shown) manage the L4 cache 306b is managed in addition to the L1 cache 302, and L2/L3 cache 304. In operation, hardware managed layers 312 manages spills and fetches between L1 cache 302 and L2/L3 caches 304 and system memory 306. Additionally, hardware managed layers 312 extends its management to include controlling spills and fetches between L4 cache 306b and flash memory 308. Thus, on a miss in L4 cache 306b, hardware managed layers 312 initiates the spill or fetch to/from flash memory 308 and also posts a load-through fault operation to operating system/software (OS/SW) managed layers 316. OS/SW 316 then handles the load-through fault operation by performing a context switch to run other work on the faulting CPUs 314 while waiting for inputs/outputs (IOs), reschedules the faulting context after a specified time, or reschedules the faulting context after a secondary async interrupt posting data-ready.

Figure 4:
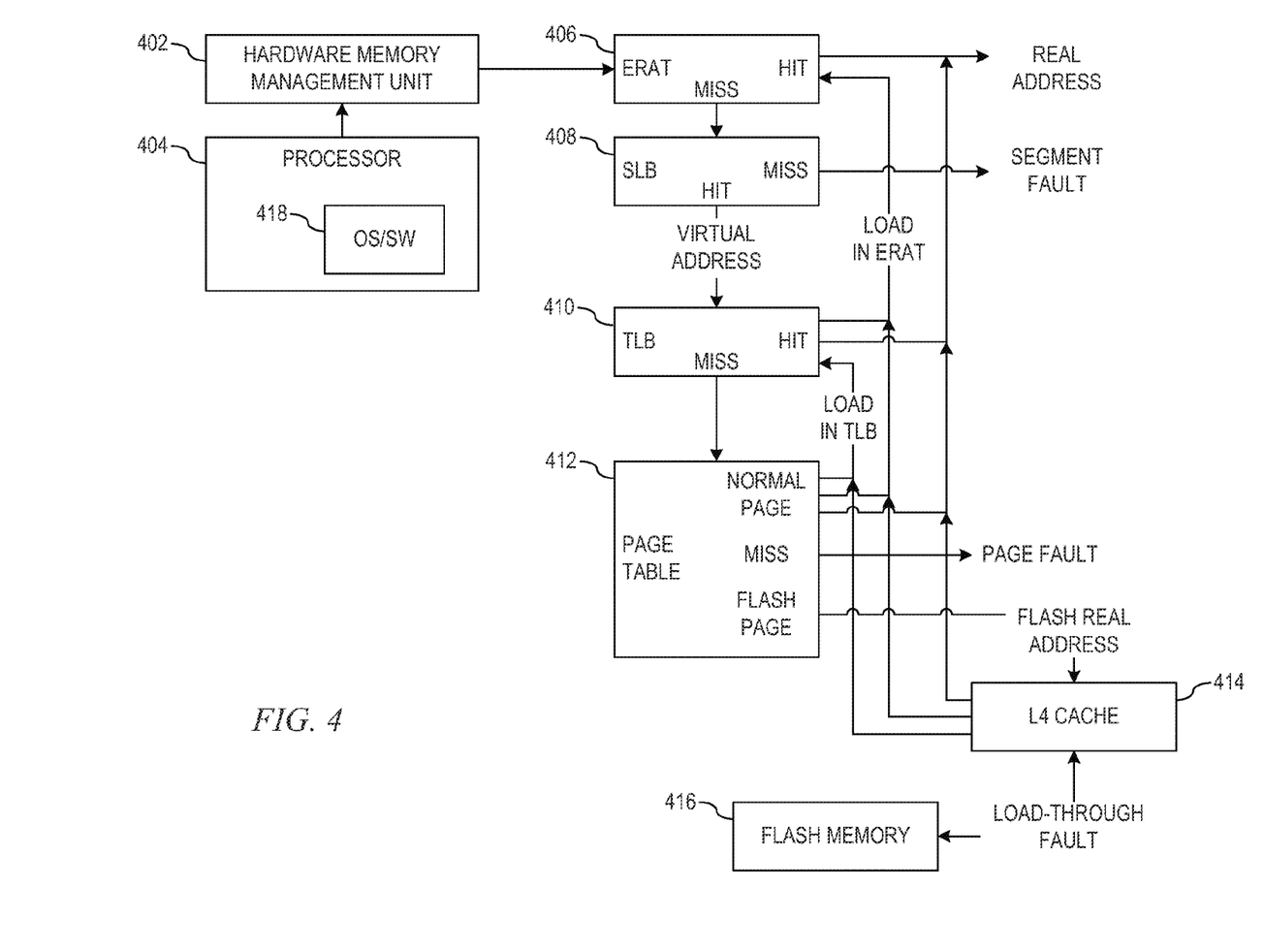
FIG. 4 depicts a functional block diagram of a memory management unit in accordance with an illustrative embodiment.

In further detail to how hardware managed layers 312 extends its management to include controlling spills and fetches between L4 cache 306b and flash memory 308, FIG. 4 depicts a functional block diagram of a memory management unit in accordance with an illustrative embodiment. In operation, memory management unit (MMU) 402 receives a load or store operation with an effective address (EA) from processor 404. Responsive to receiving the load or store operation with the EA, MMU 402 searches effective to real address table (ERAT) 406 for the real address (RA) associated with the EA. If MMU 402 identifies the RA associated with the EA (a hit) in ERAT 406, MMU 402 issues the load or store operation using the RA. However, if MMU 402 fails to identify the RA associated with the EA (a miss) in ERAT 406, MMU 402 searches segment lookaside buffer (SLB) 408 for the virtual address (VA) associated with the EA. If MMU 402 fails to identify the VA associated with the EA (a miss) in SLB 408, MMU 402 generates a segment fault.

However, if MMU 402 identifies the VA associated with the EA (a hit) in SLB 408, MMU 402 searches translation lookaside buffer (TLB) 410 for the real address (RA) associated with the VA. If MMU 402 identifies the RA associated with the VA (a hit) in TLB 410, MMU 402 installs the identified RA in ERAT 406. MMU 402 then issues the load or store operation using the RA. However, if MMU 402 fails to identify the RA associated with the VA (a miss) in TLB 410, MMU 402 performs a page table walk on page table 412 for the RA associated with the VA. If MMU 402 fails to identify the RA associated with the VA (a miss in a page table entry) in page table 412, MMU 402 generates a page fault.

However, if MMU 402 identifies the RA associated with the VA (a hit in the page table entry) in page table 412, MMU 402 determines whether the RA is a normal page or a flash page. If MMU 402 determines that the RA is a normal page, MMU 402 installs the RA in TLB 410 as well as ERAT 406. MMU 402 then issues the load or store operation using the RA. However, if MMU 402 determines that the RA is a flash page, MMU 402 determines whether the flash page is in L4 cache 414. If MMU 402 determines that the flash page is in L4 cache 414, then MMU 402 installs the L4 cache RA in TLB 410 as well as ERAT 406. MMU 402 then issues the load or store operation using the L4 cache RA. If MMU 402 determines that the flash page fails to be in L4 cache 414, MMU 402 generates a load-through fault. MMU 402 assigns a L4 cache RA, moves the flash page from flash memory 416 to L4 cache 414, and, optionally, generates a load-through complete fault. MMU 402 then installs the L4 cache RA in TLB 410 as well as ERAT 406. MMU 402 then issues the load or store operation using the L4 cache RA.

Additionally, when MMU 402 generates a load-through fault in response to determining that the flash page fails to be in L4 cache 414, OS/SW 418 running on processor 404 may context switch out the faulting thread and dispatch another thread on processor 404 until MMU 402 assigns a L4 cache RA and moves the flash page from flash memory 416 to L4 cache 414. During this time, OS/SW 418 may start a timer set to the latency of flash memory 416. Note that the latencies for a flash memory read vs. flash memory write may be different. Thus, OS/SW 418 may select a latency based on whether the request causing the load-through fault is a load or a store. OS/SW 418 may then dispatch the other thread until such time as the timer expires. Once the timer expires, OS/SW 418 will then perform a context switch and redispatch the original faulting thread. Alternatively, while MMU 402 is assigning a L4 cache RA and moving the flash page from flash memory 416 to L4 cache 414, OS/SW 418 may dispatch the other thread until MMU generates a load-through complete fault. Once the load-through complete fault is received from MMU 402, OS/SW 418 performs a context switch and redispatches the original faulting thread.

Further, when it is determined that a flash page must be moved from flash memory 416 to L4 cache 414, MMU 402 may need to evict a resident flash page from L4 cache 414. If MMU 402 determines that the resident flash page needs to be evicted for the new flash page to be moved into L4 cache 414, MMU 402 selects a least recently used (LRU) resident flash page from L4 cache 414. In practice, MMU 402 will attempt to proactively and continuously evict least recently used pages from L4 cache 414 so that there is always some number of L4 cache pages available for immediate allocation. For an L4 cache page selected for eviction MMU 402 retrieves the flash memory address associated with the identified resident flash page and identifies where the identified resident flash page is mapped in ERAT 406 and TLB 410. MMU 402 then determines whether the identified resident flash page is modified or dirty. If MMU 402 determines that the identified resident flash page is modified or dirty, MMU 402 writes the identified resident flash page to the flash memory address in flash memory 416. Once MMU 402 has written the identified resident flash page to the flash address in flash memory 416 or if the identified resident flash page has not been modified, MMU 402 invalidates the identified resident flash page from ERAT 406 and TLB 410.

Therefore, the illustrative embodiments provide an enhancement to virtual memory management and the memory management unit (MMU). A new field is defined for operating system (OS) managed page table so as to comprise a hardware page table entry (PTE) that maps a virtual memory page, which is for a hardware managed flash memory page. Thus, the OS has the perception of an ability to establish load-store addressability to flash memory. However, the MMU is managing a portion of system memory dedicated to function as an L4 cache in front of the flash memory. The presence of the hardware PTE entry indicates that the OS has mapped a particular flash memory page into the address space, but does not indicate whether or not the flash page is in the L4 cache. The MMU must also manage its own invalidation of hardware managed translation caches (i.e. ERATs and TLBs). As long as the targeted flash page is in the L4 cache portion of the system memory, the ERAT and TLBs remain valid. If the MMU evicts a flash page from the L4 cache portion of the system memory, the MMU must invalidate any cached TLB/ERAT translations to that page. Regardless, the OS managed hardware PTE entry remains installed in the page table.

Figure 5:
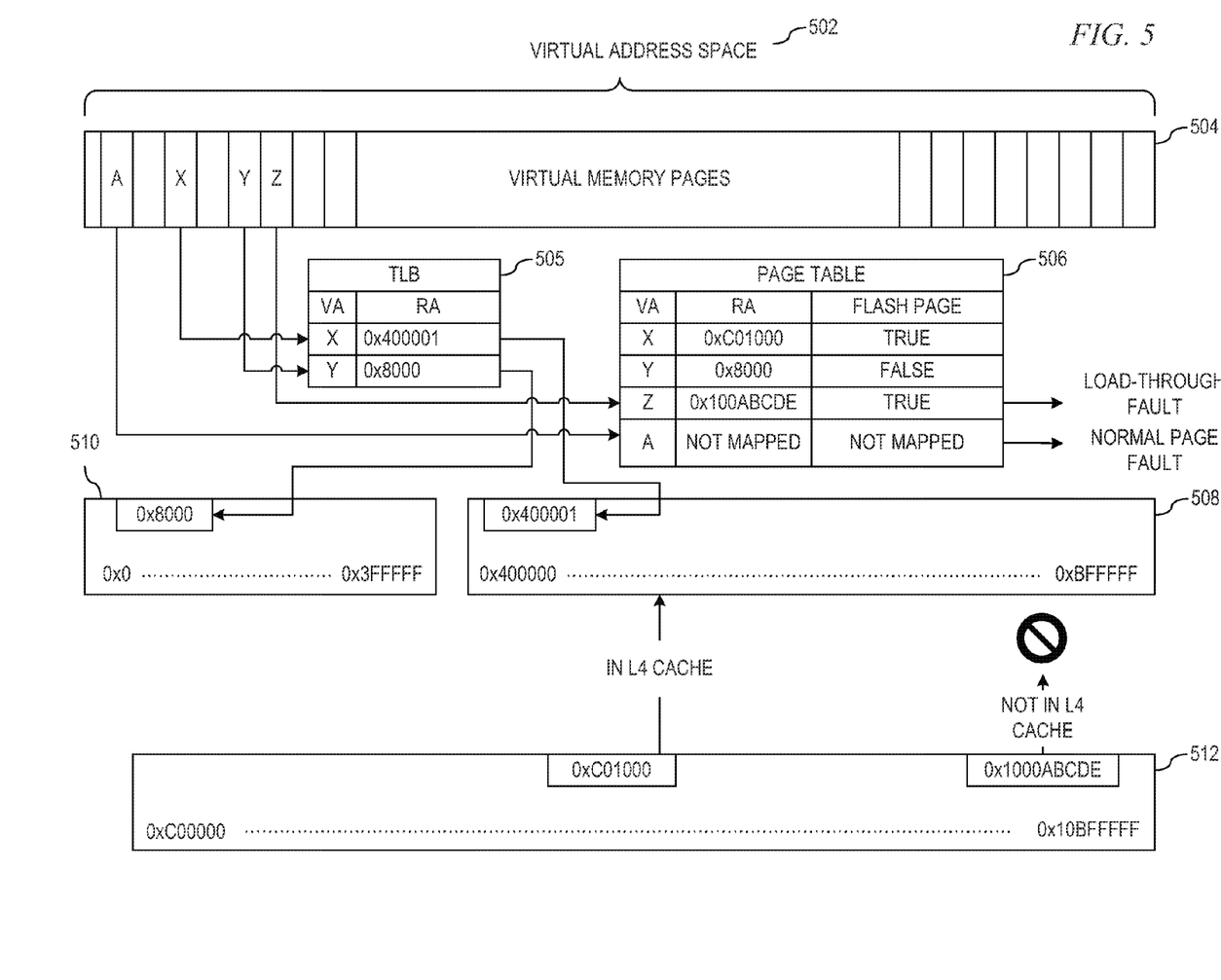
FIG. 5 illustrates an exemplary mapping between the virtual address space and system memory, which is separated into a portion that operates as system memory and a portion that operates as another level of cache (L4 cache) in accordance with an illustrative embodiment.

FIG. 5 illustrates an exemplary mapping between the virtual address space and system memory, which is separated into a portion that operates as system memory and a portion that operates as another level of cache (L4 cache) in accordance with an illustrative embodiment. As illustrated, virtual address space 502 comprises a plurality of virtual memory pages 504. Virtual memory pages 504 are translated through translation lookaside buffer (TLB) 505 or page table 506 and such that, for example, the page with virtual address (VA) of A is not mapped to a real address (RA) (results in a normal page fault). The page with a VA of X has a RA of 0xC01000 and is flagged as a flash page in page table 506. Note that the flash page (0xC01000) for X is also currently resident in the L4 cache 508 at L4 Cache RA 0x400001, with corresponding entry for X in the TLB mapping 505 to its L4 Cache page at RA 0x400001. Thus, page X is an example of a flash page that was previously referenced which resulted in it being assigned a location within the L4 cache (0x400001) and its contents moved from flash memory address 0xC01000 in flash memory 512 to DRAM address 0x400001 in L4 cache 508. The page with a VA of Y is not flagged as a flash page in page table 506 and is resident as a normal page in system memory 510 at RA 0x8000. The page with a VA of Z has a RA of 0x100ABCDE and is a flash page, but is not currently resident in the L4 cache 508. When Z is referenced it will result in the flash page 0x100ABCDE being moved into an L4 Cache page with the use of a load-through fault.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
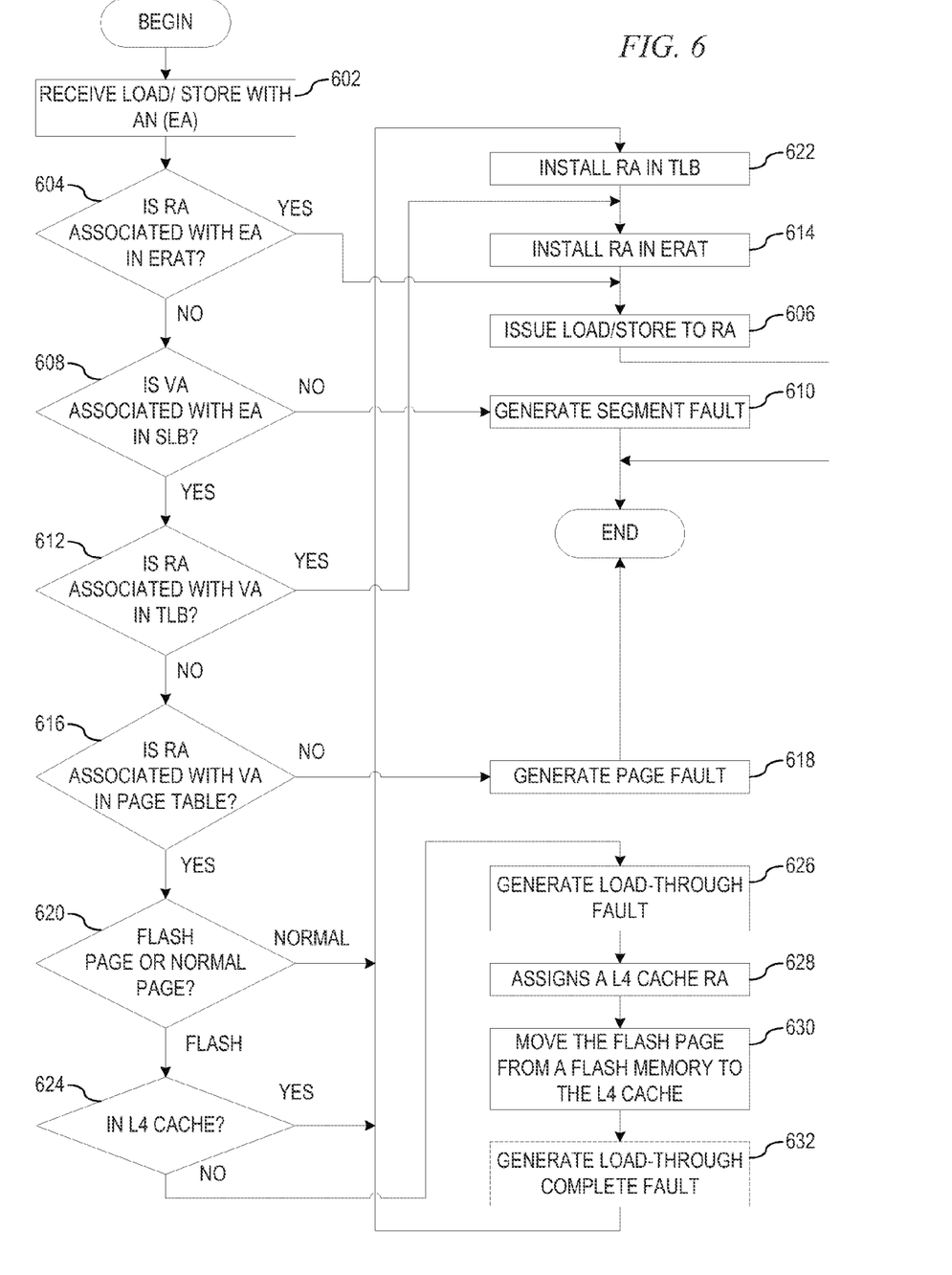
FIG. 6 depicts a flowchart of the operation performed by a memory management unit (MMU) in managing a system memory implemented cache in accordance with an illustrative embodiment.

FIG. 6 depicts a flowchart of the operation performed by a memory management unit (MMU) in managing a system memory implemented cache in accordance with an illustrative embodiment. As the operation begins, the MMU receives a load or store operation with an effective address (EA) from a processor (step 602). The MMU searches an effective to real address table (ERAT) for the real address (RA) associated with the EA (step 604). If at step 604 the MMU identifies the RA associated with the EA (a hit) in the ERAT, the MMU issues the load or store operation using the RA (step 606), with the operation ending thereafter. If at step 604 the MMU fails to identify the RA associated with the EA (a miss) in the ERAT, the MMU searches a segment lookaside buffer (SLB) for the virtual address (VA) associated with the EA (step 608). If at step 608 the MMU fails to identify the VA associated with the EA (a miss) in the SLB, the MMU generates a segment fault (step 610), with the operation ending thereafter.

If at step 608 the MMU identifies the VA associated with the EA (a hit) in the SLB, the MMU searches a translation lookaside buffer (TLB) for the real address (RA) associated with the VA (step 612). If at step 612 the MMU identifies the RA associated with the VA (a hit) in the TLB, the MMU installs the identified RA in the ERAT (step 614), with the operation proceeding to step 606 thereafter. If at step 612 the MMU fails to identify the RA associated with the VA (a miss) in the TLB, the MMU performs a page table walk on a page table for the RA associated with the VA (step 616). If at step 616 the MMU fails to identify the RA associated with the VA (a miss in a page table entry) in the page table, the MMU generates a page fault (step 618), with the operation ending thereafter.

If at step 616 the MMU identifies the RA associated with the VA (a hit in the page table entry) in the page table, the MMU determines whether the RA is a normal page or a flash page (step 620). If the MMU determines that the RA is a normal page, the MMU installs the RA of the page in the TLB (step 622), with the operation proceeding to step 614 thereafter. If at step 620 the MMU determines that the RA is a flash page, the MMU determines whether the flash page is in a L4 cache portion of the system memory (step 624). If at step 624 the MMU determines that the flash page is in the L4 cache portion of the system memory, the operation proceeds to step 622 to install the L4 cache RA into the TLB. If at step 624, the MMU determines that the flash page fails to be in L4 cache portion of the system memory, then MMU generates a load-through fault (step 626). The MMU assigns a L4 cache RA (step 628) and moves the flash page from a flash memory to the L4 cache portion of the system memory (step 630). As an optional step, then MMU may generate a load-through complete fault (step 632) to indicate that the flash page has been loaded in the L4 portion of the system memory. The operation then proceeds to step 622 thereafter to install the L4 cache RA into the TLB.

Figure 7:
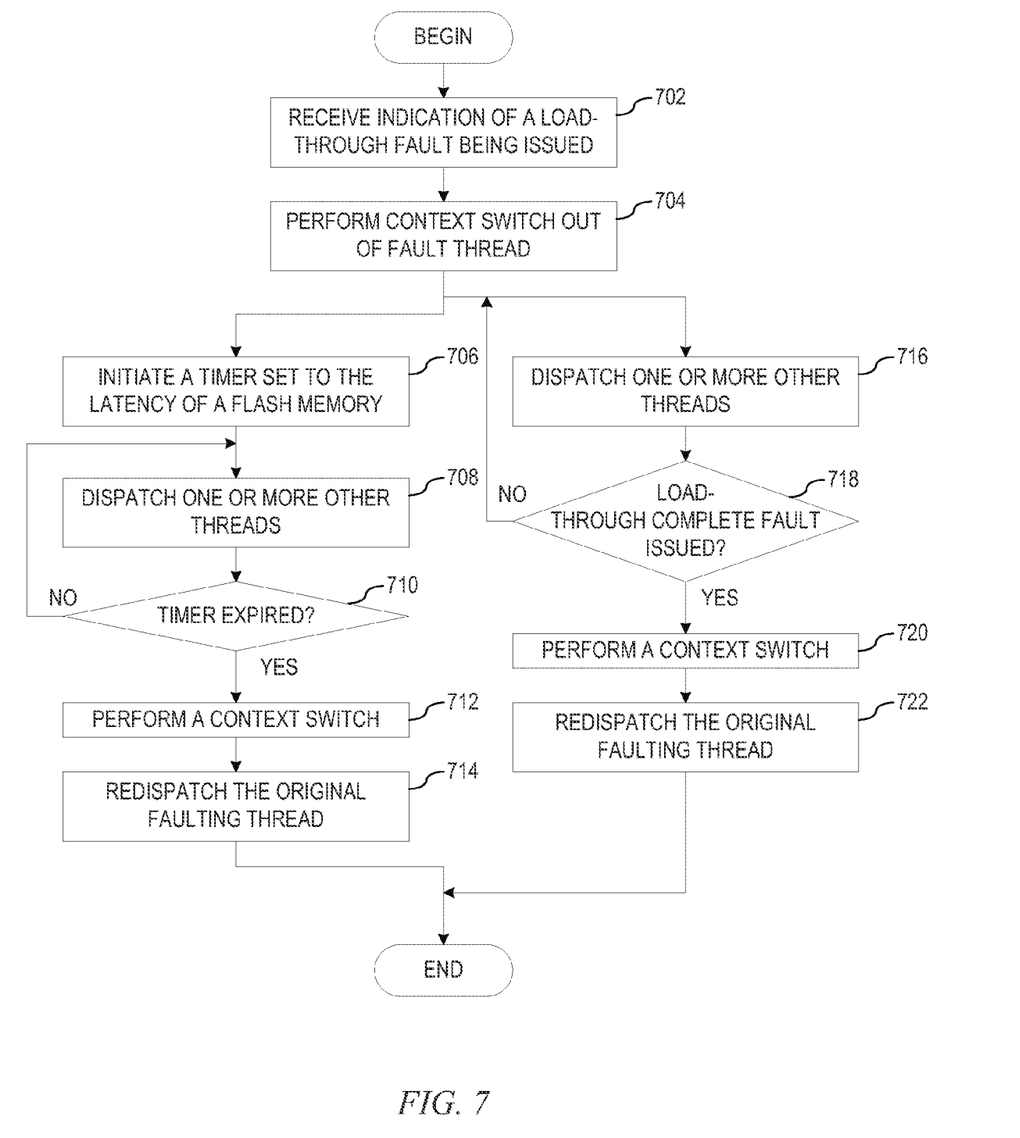
FIG. 7 depicts a flowchart of the operation performed by an operating system and/or software (OS/SW) executed by a processor in response to a load-through fault being issued to the processor in accordance with an illustrative embodiment.

FIG. 7 depicts a flowchart of the operation performed by an operating system and/or software (OS/SW) executed by a processor in response to a load-through fault being issued to the processor in accordance with an illustrative embodiment. As the operation begins, the processor receives an indication of a load-through fault being issued (step 702). In response, the OS/SW performs a context switch out of the faulting thread (step 704) until the flash page has been loaded in the L4 portion of the system memory. From step 704 there are two paths that may be executed. In the first path, the OS/SW initiates a timer set to the latency of the flash memory (step 706). Note that the latencies for a flash memory read vs. flash memory write may be different. Thus, the OS/SW may select a latency based on whether the request that faulted is a load or a store. The OS/SW then dispatches one or more other threads (step 708). The processor then determines whether the timer has expired (step 710). If at step 710 the timer has not expired, the operation returns to step 708. If at step 710 the timer has expired, the OS/SW performs a context switch (step 712) and redispatches the original faulting thread (step 714) to retry the original faulting load or store operation, with the operation ending thereafter. In the second path from step 704, the OS/SW dispatches one or more other threads (step 716). The processor then determines whether a load-through complete fault has been issued (step 718). If at step 718 the load-through complete fault has not been issued, the operation returns to step 716. If at step 718 the load-through complete fault has been issued, the OS/SW performs a context switch (step 720) and redispatches the original faulting thread (step 722) to retry the original faulting load or store operation, with the operation ending thereafter.

Figure 8:
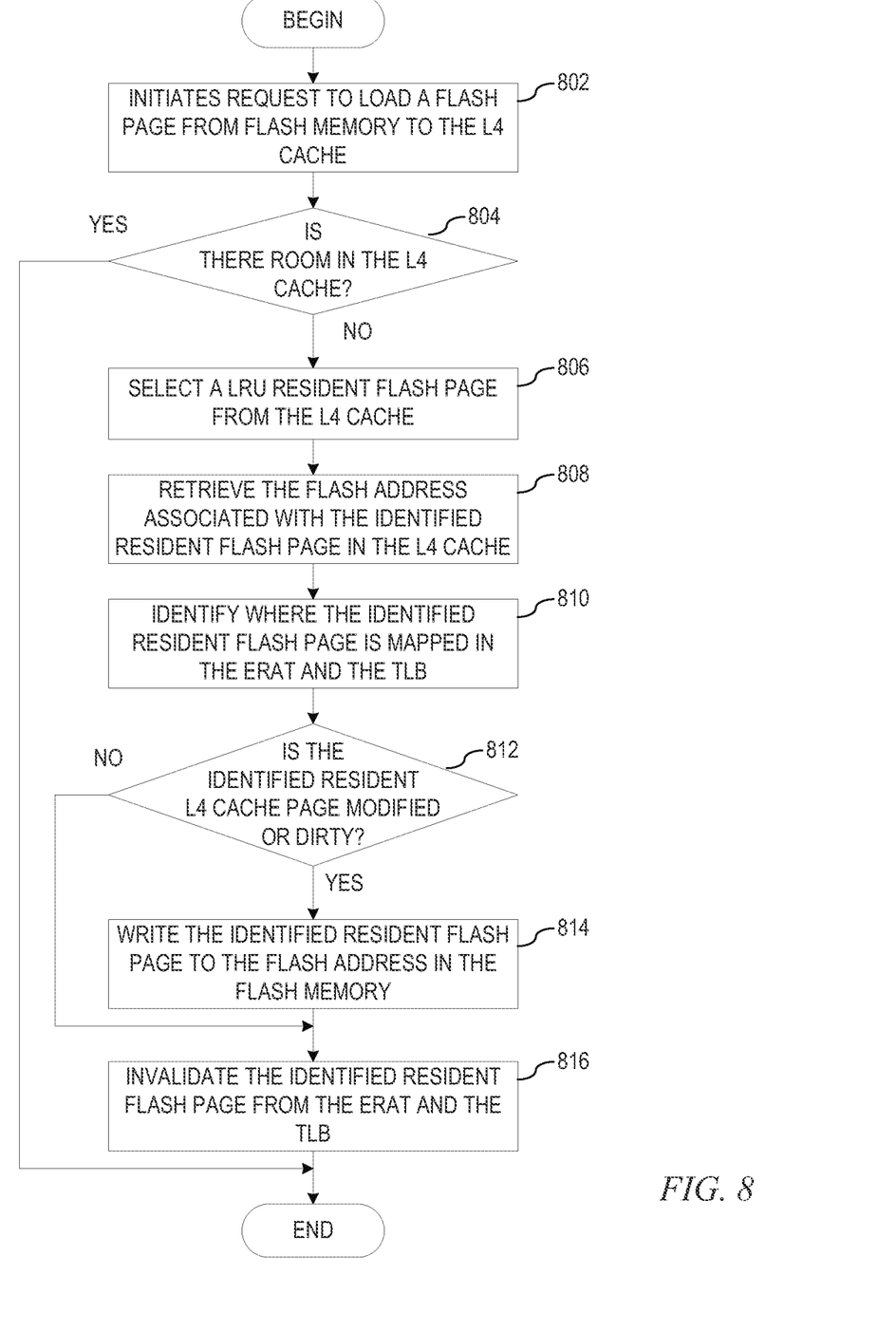
FIG. 8 depicts a flowchart of the operation performed by a memory management unit (MMU) in evicting a resident flash page from a L4 cache portion of a system memory in response to another page needing to be loaded or proactively in order to maintain some number of free L4 cache pages available for immediate allocation in accordance with an illustrative embodiment.

FIG. 8 depicts a flowchart of the operation performed by a memory management unit (MMU) in evicting a resident flash page from a L4 cache portion of a system memory in response to another page needing to be loaded or proactively in order to maintain some number of free L4 cache pages available for immediate allocation in accordance with an illustrative embodiment. As the operation begins, the MMU initiates a request to load a flash page from a flash solid state drive (SSD) to the L4 cache portion of the system memory (step 802). The MMU determines whether there is room for the flash page in the L4 cache portion of the system memory (step 804). If at step 804 there is room on the L4 cache portion of the system memory, then the operation ends. If at step 804 there is no room in the L4 cache portion of the system memory, then the MMU selects a least recently used (LRU) resident flash page from the L4 cache (step 806).

The MMU retrieves the flash address associated with the identified resident flash page in the L4 cache (step 808). The MMU identifies where the identified resident flash page is mapped in an effective to real address table (ERAT) and a translation lookaside buffer (TLB) (step 810). The MMU determines whether the identified L4 cache page is modified or dirty (step 812). If at step 812 the MMU determines that the identified resident flash page is modified or dirty, the MMU writes the identified resident flash page to the flash address in the flash SSD (step 814). From step 814 or if at step 812 the MMU determines that the identified resident flash page is not modified or dirty, the MMU invalidates the identified resident flash page from the ERAT and the TLB (step 816), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a new collaborative form of virtual memory management between the operating system and hardware memory management unit, resulting in a hybrid hardware managed cache with operating system virtual memory management. Another level of hardware managed cache is implemented in system memory, such as a DRAM, in front of flash memory. In this case, the hardware memory management unit is completely managing the DRAM cache, performing its own least recently used (LRU) algorithms, and managing the movement of data between the DRAM cache and the flash memory. By creating this hardware managed cache in the DRAM, the operating system is alleviated from performing any management of the new hardware managed cache in software running on the CPUs. However, a worst case latency due to a miss in the new hardware managed cache is now a function of the flash memory latency. This latency, which may be on the order of 10's to 100's of microseconds, may not acceptable for a CPU load or store to be stalled waiting for the load or store to complete. Therefore, the illustrative embodiments also provide an additional enhancement to the virtual memory management.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

responsive to receiving a request to perform an operation at an effective address, determine whether a real address associated with the effective address resides in a page table:

responsive to the real address existing in the page table, determine whether the real address refers to a flash page or a normal page;

responsive to the real address referring to a flash page, determine whether the flash page resides in a portion of system memory dedicated as the hybrid hardware managed cache;

responsive to the flash page failing to reside in the hybrid hardware managed cache:

issue a load-through fault thereby allowing a faulting processor executing the request to execute other work while the flash page is brought into the hybrid hardware managed cache;

assign a new hybrid hardware managed cache real address in the hybrid hardware managed cache; and move the flash page from a flash memory to the hybrid hardware managed cache; and issue the operation to the new hybrid hardware managed cache real address.

2. The computer program product of claim 1, wherein the computer readable program further causes the computing device to:

install the new hybrid hardware managed cache real address in a translation lookaside buffer (TLB); and install the new hybrid hardware managed cache real address in an effective to real address table (ERAT).

3. The computer program product of claim 1, wherein the computer readable program further causes the computing device to:

responsive to the flash page residing in the hybrid hardware managed cache, install the real address associated with the flash page in a translation lookaside buffer (TLB);
install the real address associated with the flash page in an effective to real address table (ERAT); and
reissue the operation to the real address associated with the flash page.

4. The computer program product of claim 1, wherein the computer readable program further causes the computing device to:
responsive to the load-through fault being issued, perform a first context switch out of the faulting thread;
initiate a timer set to a latency of a flash memory;
dispatch one or more other threads;
responsive to the time expiring, perform a second context switch; and
redispatch the original faulting thread.

5. The computer program product of claim 4, wherein the timer duration is selected based on whether the request causing the load-through fault is a load or a store.

6. The computer program product of claim 1, wherein the computer readable program further causes the computing device to:
responsive to the load-through fault being issued, perform a first context switch out faulting thread;
dispatch one or more other threads;
responsive to a load-through complete atilt bein$_g$ issued, perform a second context switch; and
redispatch the original faulting thread.

7. The computer program product of claim 1, wherein the system memory is a dynamic random-access memory (DRAM).

8. The computer program product of claim 1, wherein the flash memory is a flash solid state drive (SSD), a flash dual inline memory module (DIMM), or a flash Peripheral Component interconnect (PCI) card.

9. An apparatus comprising;
a processor; and
a memory coupled to the processor, wherein the memory comprises instructions which, when executed by the processor, cause the processor to:
responsive to receiving a request to perform an operation at an effective address, determine whether a real address associated with the effective address resides in a page table;
responsive to the real address existing in the page table, determine whether the real address refers to a flash page or a normal page;
responsive to the real address referring to a flash page, determine whether the flash page resides in a portion of system memory dedicated as the hybrid hardware managed cache;
responsive to the flash page failing to reside in the hybrid hardware managed cache:
issue a load-through fault thereby allowing a faulting processor executing the request to execute other work while the flash page is brought into the hybrid hardware managed cache:
assign a new hybrid hardware managed cache real address in the hybrid hardware managed cache; and
move the flash page from a flash memory to the hybrid hardware managed cache; and
issue the operation to the new hybrid hardware managed cache real address.

10. The apparatus of claim 9, wherein the instructions further cause the processor to:
install the new hybrid hardware managed cache real address in a translation lookaside buffer (TLB); and
install the new hybrid hardware managed cache real address in an effective to real address table (ERAT).

11. The apparatus of claim 9, wherein the instructions her cause the processor to:
responsive to the flash page residing in the hybrid hardware managed cache, install the real address associated with the flash page in a translation lookaside buffer (TLB);
install the real address associated with the flash page in an effective to real address table (ERAT); and
reissue the operation to the real address associated with the flash page.

12. The apparatus of claim 9, wherein the instructions further cause the processor to:
responsive to the load-through fault being issued, perform a first context switch out of the faulting thread;
initiate a timer set to a latency of a flash memory;
dispatch one or more other threads;
responsive to the time expiring, perform a second context switch; and
redispatch the original faulting thread.

13. The apparatus of claim 12, wherein the timer duration is selected based on whether the request causing the load-through fault is a load or a store.

14. The apparatus of claim 9, wherein the instructions further cause the processor to:
responsive to the load-through fault being issued, perform a first context switch out faulting thread;
dispatch one or more other threads;
responsive to a load-through complete fault being issued, perform a second context switch; and
redispatch the original faulting thread.

15. The apparatus of claim 9, wherein the system memory is a dynamic random-access memory (DRAM).

16. The apparatus of claim 9, wherein the flash memory is a flash solid state drive (SSD), a flash dual inline memory module (DIMM), or a flash Peripheral Component interconnect (PCI) card.

* * * * *